(12) United States Patent
Cherevatsky et al.

(10) Patent No.: US 10,563,961 B2
(45) Date of Patent: Feb. 18, 2020

(54) PRE-STRESSED CURVED CERAMIC PLATES/TILES AND METHOD OF PRODUCING SAME

(71) Applicant: IMI Systems Ltd., Ramat Hasharon (IL)

(72) Inventors: Abel Cherevatsky, Modiin (IL); Benjamin Yavin, Rishon Lezion (IL)

(73) Assignee: IMI Systems Ltd., Ramat HaSharon (IL)

( * ) Notice: Subject to any disclaimer, the term of this patent is extended or adjusted under 35 U.S.C. 154(b) by 0 days.

(21) Appl. No.: 16/170,214

(22) Filed: Oct. 25, 2018

(65) Prior Publication Data

US 2019/0063879 A1 Feb. 28, 2019

Related U.S. Application Data

(62) Division of application No. 15/112,884, filed as application No. PCT/IL2015/050107 on Jan. 29, 2015, now Pat. No. 10,139,201.

(30) Foreign Application Priority Data

Feb. 2, 2014 (IL) .......................................... 230775

(51) Int. Cl.
*B29C 70/56* (2006.01)
*B29C 70/34* (2006.01)
(Continued)

(52) U.S. Cl.
CPC ........... *F41H 5/0435* (2013.01); *B29C 53/56* (2013.01); *B29C 65/44* (2013.01);
(Continued)

(58) Field of Classification Search
None
See application file for complete search history.

(56) References Cited

U.S. PATENT DOCUMENTS

| 355,210 A | 12/1886 | Rivers et al. |
| 3,559,210 A | 2/1971 | Hansen |

(Continued)

FOREIGN PATENT DOCUMENTS

| CA | 2881271 A1 | 2/2014 |
| EP | 0322719 A1 | 7/1989 |

(Continued)

OTHER PUBLICATIONS

International Search Report and Written Opinion for PCT/IL2015/050107, dated May 17, 2015; ISA/IL.

(Continued)

*Primary Examiner* — Jeffry H Aftergut
(74) *Attorney, Agent, or Firm* — Harness, Dickey & Pierce, P.L.C.

(57) ABSTRACT

A pre-stressed curved plate comprising a curved plate having at least one concave surface, the curved plate being enveloped and adhesively bonded with tensioned reinforcing fibers, whereby the reinforcing fibers are first wound around the plate under tension being spaced apart from the concave surface and subsequently subjected to pressure to stretch and bond the reinforcing fibers to the surfaces of the plate, where upon bonding, the tensile strain of the fiber introduces stress in the plate.

7 Claims, 2 Drawing Sheets

(51) Int. Cl.
- *F41H 5/04* (2006.01)
- *B32B 5/04* (2006.01)
- *B32B 9/00* (2006.01)
- *B32B 9/04* (2006.01)
- *B32B 1/00* (2006.01)
- *B32B 3/04* (2006.01)
- *C04B 35/117* (2006.01)
- *C04B 35/563* (2006.01)
- *C04B 35/565* (2006.01)
- *C04B 35/58* (2006.01)
- *C04B 35/581* (2006.01)
- *C04B 35/584* (2006.01)
- *C04B 35/80* (2006.01)
- *C04B 37/00* (2006.01)
- *B32B 5/02* (2006.01)
- *B32B 7/12* (2006.01)
- *B32B 3/08* (2006.01)
- *B32B 3/26* (2006.01)
- *B32B 7/05* (2019.01)
- *B29C 53/56* (2006.01)
- *B29C 65/44* (2006.01)
- *B29C 65/48* (2006.01)
- *B29C 65/00* (2006.01)
- *B29K 709/02* (2006.01)

(52) U.S. Cl.
CPC .......... *B29C 65/4815* (2013.01); *B29C 70/34* (2013.01); *B29C 70/56* (2013.01); *B32B 1/00* (2013.01); *B32B 3/04* (2013.01); *B32B 3/08* (2013.01); *B32B 3/26* (2013.01); *B32B 5/022* (2013.01); *B32B 5/04* (2013.01); *B32B 7/05* (2019.01); *B32B 7/12* (2013.01); *B32B 9/005* (2013.01); *B32B 9/047* (2013.01); *C04B 35/117* (2013.01); *C04B 35/563* (2013.01); *C04B 35/565* (2013.01); *C04B 35/581* (2013.01); *C04B 35/584* (2013.01); *C04B 35/58071* (2013.01); *C04B 35/803* (2013.01); *C04B 35/806* (2013.01); *C04B 37/008* (2013.01); *B29C 66/74611* (2013.01); *B29K 2709/02* (2013.01); *B29K 2995/0089* (2013.01); *B32B 2250/02* (2013.01); *B32B 2260/021* (2013.01); *B32B 2262/02* (2013.01); *B32B 2262/0253* (2013.01); *B32B 2262/0261* (2013.01); *B32B 2262/0269* (2013.01); *B32B 2262/101* (2013.01); *B32B 2262/103* (2013.01); *B32B 2262/106* (2013.01); *B32B 2307/732* (2013.01); *B32B 2437/04* (2013.01); *B32B 2571/02* (2013.01); *B32B 2605/00* (2013.01); *B32B 2605/12* (2013.01); *B32B 2605/18* (2013.01); *C04B 2235/5248* (2013.01); *C04B 2237/343* (2013.01); *C04B 2237/36* (2013.01); *C04B 2237/365* (2013.01); *C04B 2237/366* (2013.01); *C04B 2237/368* (2013.01); *C04B 2237/76* (2013.01)

(56) References Cited

U.S. PATENT DOCUMENTS

| | | | |
|---|---|---|---|
| 3,633,520 | A | 1/1972 | Stiglich, Jr. |
| 3,671,374 | A | 6/1972 | Kolarik |
| 3,683,828 | A | 8/1972 | Alliegro et al. |
| 3,702,593 | A | 11/1972 | Fine |
| 3,765,300 | A | 10/1973 | Taylor et al. |
| 3,793,648 | A | 2/1974 | Dorre et al. |
| 3,796,564 | A | 3/1974 | Taylor et al. |
| 3,802,850 | A | 4/1974 | Clougherty |
| 3,873,998 | A | 4/1975 | Norris et al. |
| 4,030,427 | A | 6/1977 | Goldstein |
| 4,613,535 | A | 9/1986 | Harpell et al. |
| 4,704,943 | A | 11/1987 | McDougal |
| 4,760,611 | A | 8/1988 | Huet et al. |
| 4,824,008 | A | 4/1989 | Luszcz et al. |
| 4,836,084 | A | 6/1989 | Vogelesang et al. |
| 4,868,040 | A | 9/1989 | Hallal et al. |
| 4,869,175 | A | 9/1989 | McDougal |
| 4,871,826 | A | 10/1989 | Seyferth et al. |
| 4,875,616 | A | 10/1989 | Nixdorf |
| 5,007,326 | A | 4/1991 | Gooch, Jr. et al. |
| 5,014,593 | A | 5/1991 | Auyer et al. |
| 5,032,466 | A | 7/1991 | Cappa |
| 5,326,606 | A | 7/1994 | Labock |
| 5,354,536 | A | 10/1994 | Ezis |
| 5,371,049 | A | 12/1994 | Moffett et al. |
| 5,372,978 | A | 12/1994 | Ezis |
| 5,635,288 | A | 6/1997 | Park |
| 5,654,518 | A | 8/1997 | Dobbs |
| 5,705,764 | A | 1/1998 | Schade et al. |
| 5,771,489 | A | 6/1998 | Snedeker |
| 5,804,757 | A | 9/1998 | Wynne |
| 5,935,678 | A | 8/1999 | Park |
| 5,970,843 | A | 10/1999 | Strasser et al. |
| 6,135,006 | A | 10/2000 | Strasser et al. |
| 6,314,858 | B1 | 11/2001 | Strasser et al. |
| 6,389,594 | B1 * | 5/2002 | Yavin .................. F41H 5/0428 2/2.5 |
| 6,395,396 | B1 | 5/2002 | Hanse |
| 6,408,733 | B1 | 6/2002 | Perciballi |
| 6,489,036 | B1 | 12/2002 | Sherman |
| 6,601,497 | B2 | 8/2003 | Ghiorse et al. |
| 6,609,452 | B1 | 8/2003 | McCormick et al. |
| 6,792,843 | B2 | 9/2004 | Mohr et al. |
| 6,805,034 | B1 | 10/2004 | McCormick et al. |
| 6,860,186 | B2 | 3/2005 | Cohen |
| 6,862,970 | B2 | 3/2005 | Aghajanian et al. |
| 6,912,944 | B2 | 7/2005 | Lucuta et al. |
| 6,973,879 | B1 | 12/2005 | McElroy et al. |
| 6,995,103 | B2 | 2/2006 | Aghajanian |
| 7,026,045 | B2 | 4/2006 | Rettenbacher et al. |
| 7,037,865 | B1 | 5/2006 | Kimberly |
| 7,070,242 | B2 | 7/2006 | Mears et al. |
| 7,073,703 | B2 | 7/2006 | Takahashi et al. |
| 7,104,177 | B1 | 9/2006 | Aghajanian et al. |
| 7,104,178 | B1 | 9/2006 | Zank |
| 7,128,963 | B2 | 10/2006 | Benitsch |
| 7,197,972 | B2 | 4/2007 | Aghajanian et al. |
| 7,238,414 | B2 | 7/2007 | Benitsch et al. |
| 7,256,353 | B2 | 8/2007 | Osanai et al. |
| 7,284,469 | B2 | 10/2007 | Raichel et al. |
| 7,284,470 | B2 | 10/2007 | Huber et al. |
| 7,300,893 | B2 | 11/2007 | Barsoum et al. |
| 7,332,221 | B2 | 2/2008 | Aghajanian et al. |
| 7,357,062 | B2 | 4/2008 | Joynt |
| 7,549,366 | B2 | 6/2009 | Park et al. |
| 7,562,612 | B2 | 7/2009 | Lucuta et al. |
| 7,571,493 | B1 | 8/2009 | Purvis et al. |
| 7,598,651 | B2 | 10/2009 | Kornbluh et al. |
| 7,598,652 | B2 | 10/2009 | Kornbluh et al. |
| 7,608,322 | B2 | 10/2009 | Thurau et al. |
| 7,617,757 | B2 | 11/2009 | Dickson |
| 7,622,405 | B1 | 11/2009 | Arvidson et al. |
| 7,642,206 | B1 | 1/2010 | Bhatnagar et al. |
| 7,681,485 | B2 | 3/2010 | Neal |
| 7,685,922 | B1 | 3/2010 | Martin et al. |
| 7,718,245 | B2 | 5/2010 | Bhatnagar et al. |
| 7,762,175 | B1 | 7/2010 | Bhatnagar et al. |
| 7,790,252 | B2 | 9/2010 | Nematollahi |
| 7,799,710 | B1 | 9/2010 | Tan |
| 7,827,898 | B2 | 11/2010 | Park et al. |
| 7,827,899 | B2 | 11/2010 | Ravid et al. |
| 7,837,086 | B2 | 11/2010 | Brice et al. |
| 7,866,248 | B2 | 1/2011 | Moore, III et al. |
| 2003/0092558 | A1 | 5/2003 | Aghajanian |
| 2003/0110931 | A1 | 6/2003 | Aghajanian et al. |
| 2003/0110932 | A1 | 6/2003 | Mohr et al. |
| 2004/0065868 | A1 | 4/2004 | Aghajanian et al. |

(56) References Cited

U.S. PATENT DOCUMENTS

| | | |
|---|---|---|
| 2005/0217471 A1 | 10/2005 | Benitsch |
| 2006/0048640 A1 | 3/2006 | Terry et al. |
| 2006/0169128 A1 | 8/2006 | Aghajanian et al. |
| 2006/0213360 A1 | 9/2006 | Ravid et al. |
| 2007/0110977 A1 | 5/2007 | Al-Haik et al. |
| 2007/0234896 A1 | 10/2007 | Joynt |
| 2008/0060508 A1 | 3/2008 | Micarelli |
| 2009/0042716 A1 | 2/2009 | Kear et al. |
| 2009/0293709 A1 | 12/2009 | Joynt et al. |
| 2010/0077911 A1 | 4/2010 | Simovich |
| 2010/0182218 A1 | 7/2010 | Daniel |
| 2010/0212486 A1 | 8/2010 | Kurtz et al. |
| 2010/0227114 A1 | 9/2010 | Tang et al. |
| 2010/0236393 A1 | 9/2010 | Martin et al. |
| 2010/0269975 A1 | 10/2010 | Brice et al. |
| 2011/0214561 A1 | 9/2011 | Simovich |
| 2012/0024138 A1 | 2/2012 | Carberry et al. |
| 2012/0174759 A1 | 7/2012 | Gallo |
| 2014/0076139 A1 * | 3/2014 | Bergman .............. F41H 5/0421 89/36.02 |
| 2015/0253114 A1 | 9/2015 | Neal |
| 2015/0268007 A1 * | 9/2015 | Bergman .............. F41H 5/0421 89/36.02 |
| 2015/0345913 A1 | 12/2015 | Inglefield et al. |

FOREIGN PATENT DOCUMENTS

| | | |
|---|---|---|
| EP | 0488465 A1 | 6/1992 |
| EP | 1288607 A1 | 3/2003 |
| EP | 1412693 A1 | 4/2004 |
| EP | 1925903 A2 | 5/2008 |
| EP | 2208961 A1 | 7/2010 |
| GB | 1352418 A | 5/1974 |
| GB | 2327809 A | 2/1999 |
| WO | 88/10280 A1 | 12/1988 |
| WO | 98/51988 A1 | 11/1998 |
| WO | 02/068373 A2 | 9/2002 |
| WO | 03/084872 A1 | 10/2003 |
| WO | 2005/079207 A2 | 9/2005 |
| WO | 2007/086973 A2 | 8/2007 |
| WO | 2008/054494 A2 | 5/2008 |
| WO | 2008054843 A2 | 5/2008 |
| WO | 2008/097358 A2 | 8/2008 |
| WO | 2008130451 A2 | 10/2008 |
| WO | 2010/144159 A1 | 12/2010 |
| WO | 2013001529 A1 | 1/2013 |
| WO | 2013006900 A1 | 1/2013 |

OTHER PUBLICATIONS

Carter, C. Barry et al. "Ceramic Materials," Science and Engineering, Second Edition, Table of Contents, Springer.

Sherman, D. "Quasi-Static and Dynamic Ballistic Damage Mechanisms in Confined Ceramic Tiles" Journal de Physique IV, vol. 07, 1997, pp. C3-1021-C3-1026.

Holmquist, Timothy J. et al. "Modeling Prestressed Ceramic and its Effect on Ballistic Performance," International Journal of Impact Engineering (2003).

* cited by examiner

PRE-STRESSED CURVED CERAMIC PLATES/TILES AND METHOD OF PRODUCING SAME

CROSS-REFERENCE TO RELATED APPLICATIONS

This application is a divisional of U.S. patent application Ser. No. 15/112,884 filed on Jul. 20, 2016, which is a National Phase Application under 35 U.S.C. 371 of International Application No. PCT/IL2015/050107 filed on Jan. 29, 2015, and published as WO 2015/114632 A1 on Aug. 6, 2015, which claims priority to Israel Patent Application No. 230775 filed on Feb. 2, 2014. The entire disclosures of each of the above applications are incorporated herein by reference.

FIELD

The present invention relates to pre-stressed curved ceramic plates that have improved ballistic protection characteristics and improved survivability under static and dynamic loading. The invention describes the structure of the plate, pre-stressed by an external envelope of stretched fibers bonded to the plate, and method of producing them.

BACKGROUND OF THE INVENTION

Ceramic materials are widely used for ballistic protection with the purpose of overcoming the high power penetration of projectiles, such as armor piercing (AP) projectiles, due to their relatively low density, high rigidity and high compression strength. See C. Barry Carter, M. Grant Norton, Ceramic Materials Science and Engineering, Spinger Science, 2007. Usually, ceramics are used in structures for ballistic protection in the form of plates, tiles, pellets or specially shape ceramic elements.

The significant disadvantage of these ceramic components is their low fracture toughness and the formation of a wide net of relatively long cracks during fracture. Such behavior of ceramic components reduces their ability to protect against not only around the local impact zone, but also around the wide area, which is affected by propagated cracks.

The impact on the ceramic component by a projectile generates the propagation of compression stress waves, which are reflected back from the free surfaces of the protection plate as tensile waves.

The ceramic materials have low tensile strength and usually these tensile stresses lead to the fracture of the ceramic component. It is therefore reasonable to assume that pre-stressing (initial compression) the ceramic component in a ballistic protection structure, should decrease the level of reflected tensile stresses after impact, and improve the protective ability of the ceramics component in a protection structure.

D. Sherman, J. PHYS IV FRANCE 7 1997, showed that inducing the compression stresses in the ceramics by confined frame reduces significantly their damage from impact.

T. J. Holmquist, International Journal of Impact Engineering, November 2003, evaluated the response of ceramic targets with and without pre-stress subjected to projectile impact. The results demonstrate that ballistic performance of confined ceramic targets can be improved by pre-stressing the ceramic.

U.S. Pat. No. 6,389,594 describes that an applying of the high isostatic pressure on a monolith ceramics wrapped by a composite materials impregnated with adhesives to cure it, induces the internal stresses into the ceramics and improves the multi hit capabilities of the armor.

U.S. Pat. No. 6,601,497 discloses an armor component that includes a tile having a perimeter, with optional recess to encase a wrapping material wrapped around the perimeter of the tile. The purpose of wrapping the tile is to prevent lateral expansion of the tile if it is hit. The wrapping material pre-stresses the tile, however the technique used here limits the degree of tensioning of the wrapping material by relatively low ability of tensioners and delivery system for the wrapping materials, and does not take an advantage of the tensile ability of them. The level of pre-stressing of the tile depends on the perimeter geometry of the tile, where the circular perimeter provides a uniform pressure on the tile recess. The straight sections of the tile perimeter will not supply any pressure on the tile, so this technology shouldn't be effective for monolithic ceramic plates that usually have straight perimeter lines, like personal protection ceramic plates.

U.S. Pat. No. 7,300,893 describes an armor including strain rate hardening elastomers. An option to wrap the ballistic cloth or fibers around the ceramic tiles is suggested in this invention as a way to encapsulate the elastomer, and not for pre-stressing of the ceramic plate.

U.S. Pat. No. 7,827,899 describes an armor panel to protect a body from an incoming projectile, comprising the ceramic or glass-ceramic plate and backing polyethylene cloth, encapsulated within by a wrapping layer and bonded together by applying an external pressure on this wrapping layer. An armor panel, produced by this way, contains the externally wrapped layer, but this layer doesn't induce any significant pre-stressing of the internal ceramic plate.

The above prior art relates to pre-stressing anti-ballistic flat ceramic articles.

It is an object of the present invention is to provide anti-ballistic pre-stressed curved monolithic plates/tiles and a method of producing same.

It is a further object of this invention to provide a method of preparing pre-stressed anti-ballistic curved plates/tiles.

Anti-ballistic articles containing pre-stressed curved plates/tiles according to the present invention have superior ballistic characteristics including significant reduction of damages to the plate when hit, thus, providing armor plate with an enhanced multi-hit capabilities. In addition, anti-ballistic articles containing pre-stressed curved plates of the present invention are of relatively lower weight and decreased thickness than conventional ballistic articles for achieving the same affect.

Further objectives, features and advantages of the invention will become apparent from the following detailed description taken in conjunction with the following figures.

SUMMARY OF THE INVENTION

In accordance with the present invention, there is provided a pre-stressed curved plate comprising a curved plate having at least one concave surface, said curved plate being enveloped and adhesively bonded with tensioned reinforcing fibers. In particular, there is disclosed a pre-stressed curved plate including: a curved ceramic plate having at least one concave surface; and reinforcing fibers, that are wound around the ceramic plate, wherein the reinforcing fibers are under tension and adhesively bonded thereto, whereby the curved ceramic plate is maintained under compression stress.

The aforementioned pre-stressed curved plate can be formed using reinforcing fibers wound around the concave side of the plate and spaced apart from the concave surface, and that were subjected to pressure at elevated temperature to stretch and bond the reinforcing fibers to the surfaces of the plates; and maintaining the tension after cooling, thereby stressing the plate. The bonding is effected by either applying an adhesive to the surfaces of the curved plate prior to winding the reinforcing fibers or coating the reinforcing fibers prior to or during winding.

The bonded fibers maintain the internal tension due to their stretched status and induce compression stress in the plate.

It is to be understood that the term plate used herein includes single curve or multi-curve plates or tiles and shells containing at least one concave zone.

The invention also provides methods for preparing stressed curved ceramic plates, as follows.

a. a curved plate is coated with adhesive.
   pre-tensioned reinforcing fibers are wound around the ceramic plate, contacting the convex surface of the plate, and spanning across the at least one concave surface of the plate, leaving a distance between the fibers and the concave surface.
   external pressure, such as by autoclave or press is then applied, optionally at elevated temperature, to the wound fiber on the concave side of the plate, to stretch it until it comes in contact with the at least one concave surface of the plate and is bonded thereto by curing the adhesive;
   cooling the plate, if the external pressure is applied at elevated temperature, and releasing the external pressure, whereby the bonded tensioned fibers induce compression stress on the plate.

b. the same procedure as a., with the exception that the reinforcing fibers are pre-impregnated with adhesive prior to winding or are impregnated during winding.

c. Where the tensile strength of reinforcing fibers is limited and will not allow the fibers to stretch sufficiently under applied pressure and elevated temperature, to contact the at least one concave surface, one can place a removable spacer on the at least one concave surface so that the reinforcing fibers will be wound around the spanner, increasing the length of the fiber loop, so that when the spacer is removed the reinforcing fibers will have enough length and tenacity be pressed against the at least one concave surface and adhere thereto.

DETAILED DESCRIPTION OF THE INVENTION

In accordance with the present invention, the curved plate is preferably a ceramic plate and can be made of aluminum oxide (Al2O3), boron carbide (B4C), silicon carbide (SiC), boron silicon carbide (BSC), titanium diboride (Ti B2), aluminum nitride, silicon nitride, and glass-ceramic or combinations thereof. It is preferred that the plate have a thickness of 2-30 mm. Furthermore, the plate, tile or shell may also be multi-curved containing at least one concave zone.

The reinforcing fibers are selected from aramid, poly(p-phenylene-2,6-benzobisozazole), glass, carbon, thermoplastics (polyimide, polyethylene, polypropylene) or metal (boron, steel, aluminum) fibers.

Suitable adhesives for bonding the fibers to the curved ceramic plate are preferably hot melt thermoplastic adhesives like polyethylene and polypropylene films or thermosetting adhesives like epoxy with optionally high or low curing temperatures, rubber or elastomer based adhesives, ceramic adhesives.

The fibers are preferably impregnated with an adhesive material either before or during the winding, but before subjecting them to expansion by external pressure. Alternatively, the plate can be coated with an adhesive prior to winding the reinforcing fiber.

The pre-stressed curved plate can form an insert for either personal body armor, or antiballistic panels for vehicles, ships, aircrafts and helicopters, or for a helmet.

One advantage of the pre-stressed curved plate of the present invention is that it has increased multi-hit capability.

A second advantage of the pre-stressed curved plate anti-ballistic articles containing according to the present invention is that they achieves the same ballistic characteristics with reduced weight.

During the winding procedure the fibers should have some initial tension and not be slack to assure tight winding. This can be achieved by tensioners, see S. T. Peters, W. D. Humphrey, R. F. Foral, Filament Winding, Composite Structure, Fabrication, SAMPE, ISBN 0-938994-81-6.

To maintain the tension in the wound reinforcing fibers and to induce the compression in the plate, the wound plate should be cured under applied external pressure and optionally at an elevated temperature. The external pressure should be sufficiently high to maintain full contact between the fibers and the concave surface of the plate during the curing of adhesive and final bonding of the stretched fibers to the plate. The degree of compression of the plate will depend on the curvature of the plate, the direction of winding trajectory of the fibers, and elastic modulus of the fibers. Thus, the same fibers will induce different compressions in plates with different curvatures.

In cases where the ultimate tensile strain of a fiber is so low that even under pressure and elevated temperature it would not stretch sufficiently to reach and bond to the concave surface of a ceramic plate, then it is possible to interpose a removable spacer between the concave surface of the plate and the wound fiber. The removable spacer should have an appropriate geometry to increase the length of the fibers spanning the concave surface of the curved plate, in effect transforming the concave side to convex with respect of the winding. Thus, when pressure is applied to the wound plate and the spacer is removed the fibers will be sufficiently stretched to be pressed against the concave surface of the plate and be bonded thereto. After bonding the tensile strain of the fibers will induce stress to the plate, which is maintained upon cooling.

DETAILED DESCRIPTION OF THE DRAWINGS

Figure 1:
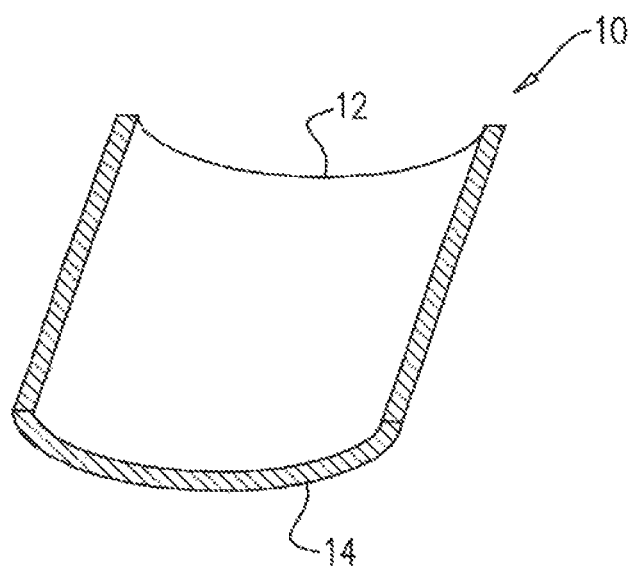
FIG. 1 illustrates a curved ceramic plate before winding with reinforcing fibers
Figure 2:
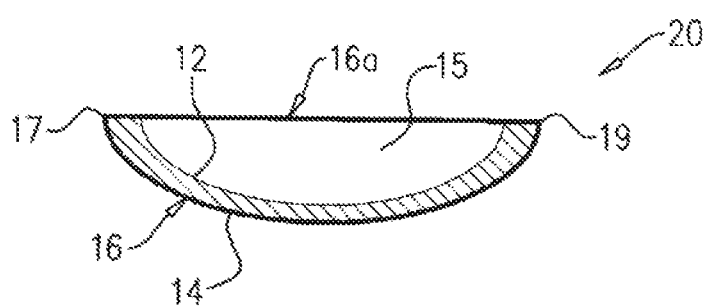
FIG. 2 is a cross-sectional view of a curved ceramic plate wound initially with reinforcing fibers in accordance with the present invention.
Figure 3:
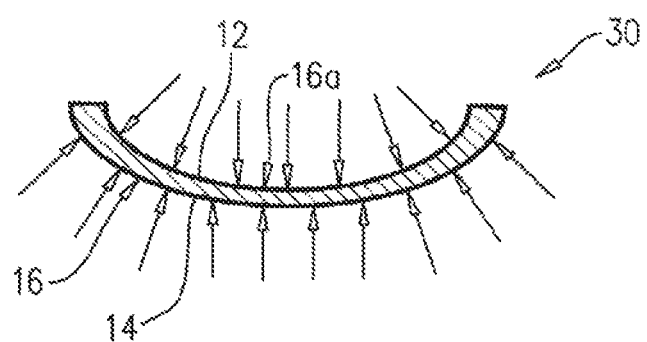
FIG. 3 is a cross-sectional view of a curved ceramic plate with wound fibers stretched and bonded to the surfaces of the plate.

FIG. 1 is a perspective view of a curved ceramic plate 10 having a concave surface 12 and a convex surface 14. In FIG. 2 the curved plate 20 is wound with adhesive coated reinforcing fibers 16 under tension. Fibers 16 thus come in direct contact with the convex surface 14 and loop around the concave surface 12 forming a taut straight line between the edges 17 and 19 of the curved plate 20, leaving a space 15 between the tautly wound fibers 16a and the concave surface 12 of the plate. FIG. 3 shows fibers 16,16a wound around a curved ceramic plate 30 after being subjected to elevated temperature of about 180° C., while applying pressure (see the arrows) against the tensioned wound fibers 16,16a, pressing the fibers against the surfaces 12 and curing it. Curing can be done by means of a hydroclave, autoclave, isotactic press or other suitable apparatus as described in U.S. Pat. No. 6,389,594. The tensioned wound fibers 16,16a are thus bonded to the concave surface 12 and compress the curved plate.

Figure 4:
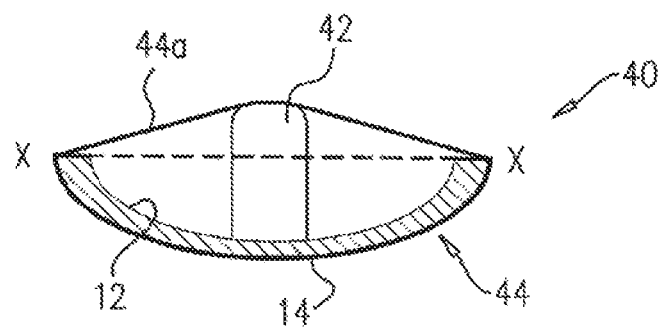
FIG. 4 is a cross-sectional view of a curved ceramic plate with spacer wound initially with reinforcing fibers prior to applying pressure at elevated temperature.

FIG. 4 illustrates in cross-section a curved ceramic plate 40 having a concave surface 12 and a convex surface 14. A removable spacer 42 is placed on the concave surface 12. Reinforcing fibers 44, 44a having low tensile strain, which would prevent the fibers from being pressed against the concave surface 12 under pressure were they stretched taut across line x-x, are wrapped around a spacer 42 raising fibers 44a over the concave surface 12 above the line x-x. This increases the length of fibers 44a on the concave side sufficiently so that when the temperature is raised and pressure is applied, and the spacer 42 is removed, fibers 44a will stretch sufficiently to reach the concave surface 12 to be bonded to the plate and cured.

The type of fiber should be chosen according to its possible elongation and maximum elastic modulus to increase the compression stresses in the plate.

It should be noted that by using different fibers and/or different adhesives and/or other bonding conditions such as different processing temperature or pressure, one may vary the degree of impregnation and/or the degree of tensioning of the fibers and/or the degree of compression, which may affect the degree of stress in the ceramic plate/tile.

In practice, ceramic plates of this invention are generally backed with an anti-ballistic cloth in anti-ballistic body protecting articles.

EXAMPLE

A number of ceramic body armor articles were prepared as follows. Aluminum oxide double curved ceramic plates 7.1 mm thick and weighing an average of 2100 g were wound with 200 g of T700 carbon fibers under tension, treated under pressure and 180 degrees temperature to pre-stress the plates, and backed with 23 layers of polyethylene cloth, with average weight of 460 g including adhesive. These articles had a general weight of 2760 g.

These articles were tested against APM2 projectiles with velocity range 868-883 m/s and provided good protection (two bullets were stopped by these articles) whereas articles with the same ceramic plates without pre-stressing have to include at least 40 layers of polyethylene cloth with average weight of 2900 g to provide the same ballistic protection.

What is claimed is:

1. A pre-stressed curved plate comprising:
    a curved ceramic plate having at least one concave surface; and
    reinforcing fibers that are wound around the ceramic plate,
    wherein the reinforcing fibers are under tension and adhesively bonded thereto, whereby the curved ceramic plate is maintained under compression stress.

2. The curved plate in accordance with claim 1, wherein the curved ceramic plate is a ceramic tile.

3. The curved plate in accordance with claim 2, wherein the ceramic plate is made of aluminum oxide (Al2O3); hot pressed, sintered or reaction bonded boron carbide (B4C); silicon carbide (SiC); boron silicon carbide (BSC);
    titanium diboride (Ti B2); aluminum nitride; silicon nitride; and glass-ceramic, or combinations thereof.

4. The curved plate in accordance with claim 1, wherein the ceramic plate has a thickness between 3-30 mm.

5. The curved plate in accordance with claim 1, wherein the reinforcing fibers are selected from aramid, poly(p-phenylene-2, 6-benzobisoxazole), S or E glass, carbon, thermoplastics (polyamide, HMWPE, polyethylene, polypropylene) or metal (boron, steel, aluminum) fibers or their combination.

6. The curved plate in accordance with claim 1, wherein the adhesive is selected from epoxy, phenolic, thermoplastic, thermosetting adhesives, rubber or elastomer based adhesives and ceramic adhesives.

7. The curved plate in accordance with claim 1, further comprising a removable spacer interposed between the concave surface of the ceramic plate and the reinforcing fibers.

* * * * *